Patented Oct. 15, 1935

2,017,613

UNITED STATES PATENT OFFICE 2,017,613

PROCESS FOR THE MANUFACTURE OF HALOGENATED PHENYLTHIOGLYCOLLIC ACIDS

Hans Veraguth, Basel, and Ernst Stöcklin, Binningen, near Basel, Switzerland, assignors to the firm of Society of Chemical Industry in Basle, Basel, Switzerland No Drawing. Application December 22, 1933, Serial No. 703,680. In Switzerland December 23, 1932

5 Claims. (Cl. 260—108)

According to this invention phenylthioglycollic acids containing halogen are made by treating with a halogenating agent a phenylthioglycollic acid of the general formula

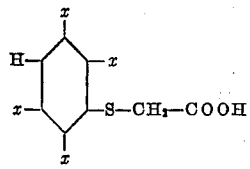

wherein both the letters $x$ in ortho-position to the thioglycollic acid grouping do not represent any groups such as, for example, CN- or CONH$_2$- groups, which can be converted into carboxyl groups by saponification, and wherein at least one of the four letters $x$ represents halogen, alkyl, an alkoxy-group or an alkylmercapto-group.

Phenylthioglycollic acids of the above general formula are, for example, ortho- and meta-chloro- or bromophenyl-1-thioglycollic acid, ortho- and meta-alkyl-, for example methyl- and ethylphenyl-1-thioglycollic acids; further, the following derivatives, insofar as they do not contain a substituent in para-position to the thioglycollic acid group: dichloro-, dibromo,- dialkyl-, dialkoxy-, dialkylmercaptophenyl-1-thioglycollic acids, for instance, the 2:5-dimethyl- and 2:5-dichloro- and 2:6-dichlorophenyl-1-thioglycollic acid. Trihalogenphenyl-1-thioglycollic acid; further, monohalogenmonoalkyl-, monohalogen-dialkyl- and dihalogenmonoalkylphenyl-1-thioglycollic acids, for instance the 2-methyl-3:5-dichlorophenyl-1-thioglycollic acid; finally, the halogenalkyloxy- and halogenalkylmercaptophenyl-1-thioglycollic acids, for instance the 2-chloro-5-ethoxyphenyl-1-thioglycollic acid.

The action of the halogenating agent on the phenylthioglycollic acid of the above general formula may occur in several different ways, preferably in the presence of a solvent or a suspension medium, such as benzene, chlorobenzene, glacial acetic acid, nitrobenzene, chloroform, tetrachlorethane, dioxane and sulfuric acid, with the use of a halogen as such, for instance chlorine or bromine, or of certain compounds that yield halogen, for instance sulfuryl chloride; in many cases, particularly when the halogenating agents just named have been used, nearly quantitative yields of the halogenated phenylthioglycollic acids are obtained.

In many cases the course of the halogenation may be favorably influenced when it is conducted in the presence of halogen carriers, for instance iodine, antimony pentachloride or iron and its salts.

The invention is of particular importance because it makes possible the production, in a very simple manner, of the halogenated phenylthioglycollic acids necessary for making indigoid dyestuffs; thus, for example, the important 4-halogen-2:5-disubstituted phenyl-1-thioglycollic acids, for instance the 4-chloro-2:5-dimethylphenyl-1-thioglycollic acid, may be obtained with excellent yield by the following new combination of steps: para-xylene is converted by the action of chlorosulfonic acid into 2:5-dimethylbenzene-1-sulfochloride; the latter is reduced by known methods to the corresponding mercapto compound which, by condensation with monohalogenacetic acid and subsequent halogenation by the process of this invention, is converted into the 4-chloro-2:5-dimethyl-1-thioglycollic acid.

The following examples illustrate the invention, the parts being by weight:—

Example 1

To a solution at 30° C. of 196 parts of 2:5-dimethylphenyl-1-thioglycollic acid of the formula

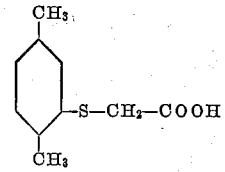

in 900 parts of chlorobenzene there are added, while stirring 1 part of antimony pentachloride and then, in the course of 1 hour, 135 parts of sulfuryl chloride, drop by drop. After further stirring for 1 hour, while the temperature is increased to about 60° C. the whole is poured into 1200 parts of water containing 170 parts of dissolved sodium carbonate, the chlorobenzene is steam-distilled and the residual solution, filtered from impurities, is acidified with hydrochloric acid. The precipitate is filtered and washed with water until free from acid and dried.

The 2:5-dimethyl-4-chlorophenyl-1-thioglycollic acid of the formula

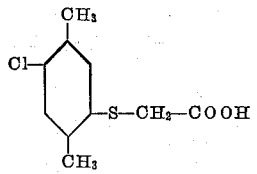

thus obtained in nearly quantitative yield, crystallizes from benzene in colorless needles of melting point 97° C.

The 2:5-dimethylphenyl-1-thioglycollic acid used as the parent material in this example may advantageously be made in the following manner:—

106 parts of para-xylene are introduced, in the course of 1–1½ hours into 425 parts of chlorosulfonic acid, the temperature being 20° C.; stirring is continued for three hours at this temperature and then the whole is poured upon ice. After some stirring the mixture is filtered and the precipitate, consisting of 2:5-dimethyl-1-benzene-sulfochloride, is washed with ice-water and dried.

204 parts of 2:5-dimethyl-1-benzene-sulfochloride of boiling point 152–155° C. under 22 mm. pressure, are dissolved in benzene and this solution is allowed to run, while stirring and in the course of half-an-hour, into a suspension of 320 parts of zinc dust in 480 parts of water at 60° C. The whole is then heated in the course of a quarter of an hour to 70° C. and the benzene distilled at 70–75° C. Into the residual mixture, after it has been allowed to cool to room temperature, are run in the course of 1 hour 2300 parts of hydrochloric acid of 25 per cent. strength at 15–20° C. The whole is then heated to 90° C. in the course of two hours, further stirred for 1 hour at 90–95° C. and then steam-distilled to expel the thiophenol which has been produced. The thiophenol is now condensed in the usual manner in alkaline solution at 70–80° C. with chloracetic acid. The 2:5-dimethylphenyl-1-thioglycollic acid thus obtained in very good yield may be recrystallized from benzene and then has the melting point of 77° C.

*Example 2*

246.5 parts of 2-chloro-5-ethoxyphenyl-1-thioglycollic acid of the formula

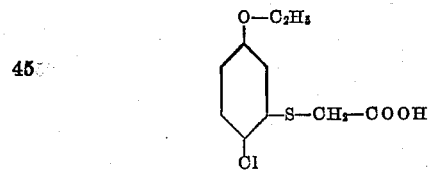

of melting point 135–136° C. are dissolved in 1500 parts of tetrachlorethane and the solution is mixed with 1 part of antimony pentachloride and a solution of 135 parts of sulfuryl chloride in 300 parts of tetrachlorethane, at 60° C. with stirring. After stirring for a short time at 60–65° C. the mixture is introduced into 10000 parts of water and the tetrachlorethane is steam-distilled under diminished pressure. The residue is then filtered and the solid matter washed free from acid, reprecipitated from a solution in sodium carbonate and dried.

The 2:4-dichloro-5-ethoxyphenyl-1-thioglycollic acid of the formula

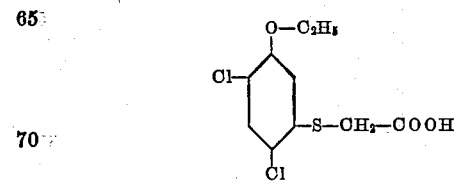

obtained in this manner in nearly quantitative yield, crystallizes from benzene in the form of colorless needles of melting point 122–123° C.

*Example 3*

182 parts of 3-methylphenyl-1-thioglycollic acid of the formula

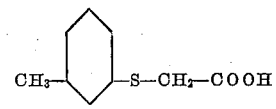

of melting point 68° C. are dissolved in 800 parts of chlorobenzene and, after addition of 1 part of antimony pentachloride, the solution is mixed, in the course of 1 hour at 30° C. and while stirring, with a solution of 135 parts of sulfuryl chloride in 140 parts of chlorobenzene. After heating the mixture for a short time at 60° C. it is introduced into a solution of 170 parts of calcined sodium carbonate in 1500 parts of water and the chlorobenzene is steam-distilled. The contents of the still are filtered from a small quantity of impurities and the filtrate is acidified with hydrochloric acid, whereupon the 4-chloro-3-methylphenyl-1-thioglycollic acid of the formula

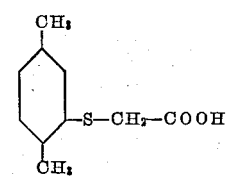

is precipitated in nearly quantitative yield; after recrystallization from benzene it melts at 104° C.

*Example 4*

A solution of 196 parts of 2:5-dimethylphenyl-1-thioglycollic acid of the formula

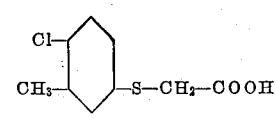

in 1100 parts of chlorobenzene, after addition of 1 part of iodine, is mixed while stirring, in the course of ¾ hour and at 30° C., with a solution of 160 parts of bromine in 200 parts of chlorobenzene. After heating for a short time to 60° C., the whole is introduced into 2000 parts of water containing in solution 170 parts of calcined sodium carbonate and the chlorobenzene is steam-distilled. The residual solution, after filtering from a small quantity of impurities, is acidified with hydrochloric acid, then filtered and the solid matter is washed with water until free from acid and dried.

The 2:5-dimethyl-4-bromophenyl-1-thioglycollic acid of the formula

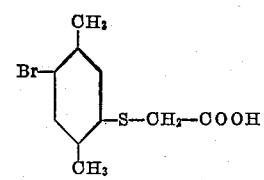

thus obtained in good yield crystallizes from benzene in thick colorless needles of melting point 107–108° C.

Example 5

229.5 parts of 2-chloro-3:5-dimethylphenyl-1-thioglycollic acid of the formula

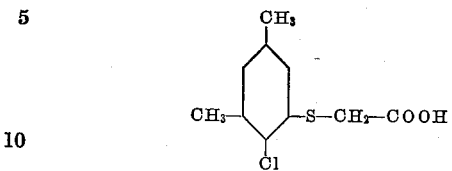

of melting point 118° C. are dissolved in 1400 parts of chlorobenzene at 50° C., 1 part of antimony pentachloride is added and then, at the said temperature, there is added, while stirring and in the course of 1 hour, a solution of 135 parts of sulfuryl chloride in 150 parts of chlorobenzene. The mixture is allowed to stand for 1 hour at 50° C. and then cooled to room temperature. Under these conditions the product of chlorination separates almost completely in a crystalline form. The 2:4-dichloro-3:5-dimethylphenyl-1-thioglycollic acid of the formula

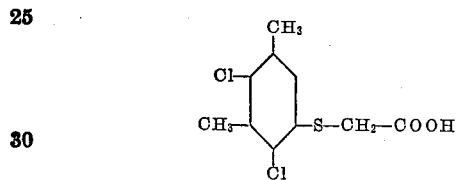

thus obtained is filtered and washed with benzene, without further purification. The yield is very good.

What we claim is:—

1. Process for the manufacture of phenylthioglycollic acids containing halogen, consisting in causing halogenating agents, in the presence of halogen carriers, to act on phenylthioglycollic acids of the general formula

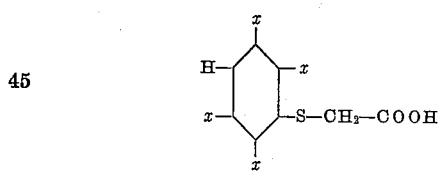

wherein at least one of the four letters $x$ represents a substituent which does not form salts, orientates to the ortho- and para-position, and contains not more than two carbon atoms, and wherein those letters $x$, which do not represent such a substituent, stand for hydrogen.

2. Process for the manufacture of phenylthioglycollic acids containing halogen, consisting in causing chlorinating agents, in presence of halogen carriers, to act on phenylthioglycollic acids of the general formula

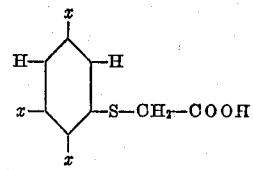

wherein at least one of the three letters $x$ represents a substituent which does not form salts, orientates to the ortho- and para-position, and contains not more than two carbon atoms, and wherein those letters $x$, which do not represent such a substituent, stand for hydrogen.

3. Process for the manufacture of phenylthioglycollic acids containing halogen, consisting in causing chlorinating agents, in presence of halogen carriers, to act on phenylthioglycollic acids of the general formula

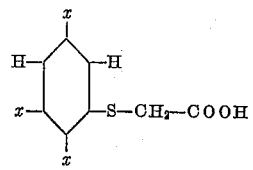

wherein at least one of the three letters $x$ represents methyl, and wherein those letters $x$, which do not represent methyl, stand for hydrogen.

4. Process for the manufacture of a phenylthioglycollic acid containing halogen, consisting in causing chlorinating agents, in presence of halogen carriers, to act on the phenylthioglycollic acid of the formula

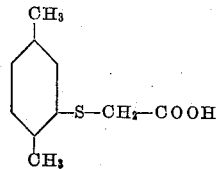

5. Process for the manufacture of a phenylthioglycollic acid containing halogen, consisting in causing sulfuryl chloride, in presence of pentachloride of antimony, to act on the phenylthioglycollic acid of the formula

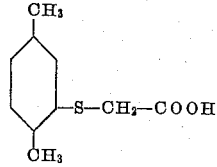

HANS VERAGUTH.
ERNST STÖCKLIN.